US008552954B2

(12) United States Patent
Lee et al.

(10) Patent No.: US 8,552,954 B2
(45) Date of Patent: Oct. 8, 2013

(54) LIQUID CRYSTAL DISPLAY SYSTEM AND PIXEL-CHARGE DELAY CIRCUIT THEREOF

(75) Inventors: Chao-Min Lee, Taoyuan County (TW); Chia-Yi Lu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 520 days.

(21) Appl. No.: 12/906,121

(22) Filed: Oct. 17, 2010

(65) Prior Publication Data

US 2012/0050247 A1 Mar. 1, 2012

(30) Foreign Application Priority Data

Aug. 24, 2010 (TW) ................................ 99128254 A

(51) Int. Cl.
*G09G 3/36* (2006.01)
*G06F 3/038* (2013.01)

(52) U.S. Cl.
USPC ............................................ 345/99; 345/212

(58) Field of Classification Search
USPC ...................................... 345/99, 100, 87, 212
See application file for complete search history.

(56) References Cited

U.S. PATENT DOCUMENTS

| | | | | |
|---|---|---|---|---|
| 6,845,140 | B2 | 1/2005 | Moon | |
| 7,027,024 | B2 | 4/2006 | Yanagi | |
| 7,808,320 | B1 * | 10/2010 | Kuo | 330/255 |
| 2003/0107407 | A1 * | 6/2003 | Aikawa | 326/93 |
| 2005/0083290 | A1 * | 4/2005 | Katagawa et al. | 345/100 |

* cited by examiner

*Primary Examiner* — Chanh Nguyen
*Assistant Examiner* — John Kirkpatrick
(74) *Attorney, Agent, or Firm* — Winston Hsu; Scott Margo

(57) ABSTRACT

A liquid crystal display system for improving display color mismatch utilizes a pixel-charge delay circuit to generate a new latch-data signal for a source driver of the liquid crystal display system according to an output-enable signal and a latch-data signal generated by a timing control circuit of the liquid crystal display system. Therefore, when the source driver charges a pixel on an mth gate line, a switch corresponding to a pixel on an (m−1)th gate line is already completely turned off.

8 Claims, 7 Drawing Sheets

| LD1 | OE1 | NLD |
|---|---|---|
| 0 | 0 | 0 |
| 0 | 1 | 1 |
| 1 | 0 | 1 |
| 1 | 1 | 0 |

FIG. 7

LIQUID CRYSTAL DISPLAY SYSTEM AND PIXEL-CHARGE DELAY CIRCUIT THEREOF

BACKGROUND OF THE INVENTION

1. Field of the Invention

The present invention is related to a liquid crystal display system and a pixel-charge delay circuit applied to a liquid crystal display system, and particularly to a liquid crystal display system and a pixel-charge delay circuit applied to a liquid crystal display system for improving display color mismatch.

2. Description of the Prior Art

In the prior art, a gate driving circuit of a liquid crystal display panel utilizes output signals of scan lines G1, G2, G3, G4, G5, . . . to turn on thin film transistors corresponding to the scan lines G1, G2, G3, G4, G5, . . . in turns. A source driving circuit of the liquid crystal display panel converts display data into a data voltage, and then charges/discharges a corresponding pixel of the liquid crystal display panel to a voltage corresponding to a gray level. The gate driving circuit turns on next row thin film transistors when last row thin film transistors are turned off completely. However, in order to prevent mistaken charging of thin film transistors, an output enable signal OE is used for adjusting a time interval between an output signal of a scan line and an output signal of an adjacent scan line. Please refer to FIG. 1. FIG. 1 is a diagram illustrating an output signal of a scan line G4 being at a logic-low voltage VGL when the output enable signal OE is enabled.

The scan lines of the liquid crystal display panel are not ideal transmission lines, and an impedance of each scan line may cause an output signal of the each scan line not to drop to the logic-low voltage VGL immediately during the output enable signal OE being enabled, so as to form a weak logic-low voltage. When the source driving circuit outputs a latch data signal LD to charge pixels of the scan line Gm, pixels of the scan line Gm-1 are also charged due to the weak logic-low voltage. Thus, the liquid crystal display panel may exhibit color mismatch. Please refer to FIG. 2. FIG. 2 is a diagram illustrating mistaken charging of the pixels due to the weak logic-low voltage. As shown in FIG. 2, the source driving circuit starts to charge the pixels of the scan line Gm when a negative edge of the latch data signal LD appears. Meanwhile, the source driving circuit also charges the pixels of the scan line Gm-1 due to the weak logic-low voltage of the scan line Gm-1, resulting in the color mismatch of the liquid crystal display panel.

SUMMARY OF THE INVENTION

An embodiment of the present invention provides a liquid crystal display system. The liquid crystal display system includes a liquid crystal display panel, a gate driving circuit, a source driving circuit, a timing control circuit, and a pixel-charge delay circuit. The liquid crystal display panel has a plurality of pixels. The gate driving circuit is used for controlling output signals of a plurality of scan lines, wherein an output signal of each scan line is used for controlling turning-on and turning-off of a switch coupled to a pixel. The source driving circuit is used for converting display data into a data voltage, then charging/discharging a corresponding pixel to a voltage corresponding to a gray level according to the data voltage. The timing control circuit is coupled to the gate driving circuit for generating and sending an output enable signal to the gate driving circuit, and a latch data signal. And the pixel-charge delay circuit is coupled to the timing control circuit and the source driving circuit for generating and sending a new latch data signal to the source driving circuit according to the output enable signal and the latch data signal.

Another embodiment of the present invention provides a pixel-charge delay circuit applied to a liquid crystal display system for improving color mismatch. The pixel-charge delay circuit includes a first flip-flop, a second flip-flop, and an exclusive-OR gate. The first flip-flop is used for generating a first latch data signal according to a positive edge of the latch data signal from a timing control circuit of the liquid crystal display system. The second flip-flop is used for generating a first output enable signal according to a negative edge of an output enable signal of the timing control circuit. The exclusive-OR gate is coupled to the first flip-flop and the second flip-flop for generating and sending the new latch data signal to a source driving circuit of the liquid crystal display system according to the first latch data signal and the first output enable signal.

A liquid crystal display system and a pixel-charge delay circuit applied to a liquid crystal display system provided by the present invention utilize a pixel-charge delay circuit to generate a new latch data signal, and a negative edge of the new latch data signal appears after a negative edge of a latch data signal. Thus, a thin film transistor of a scan line Gm-1 is turned off completely when a pixel of a scan line Gm is charged, so the present invention can solve color mismatch of the liquid crystal display panel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a truth table of the exclusive-OR gate.

DETAILED DESCRIPTION

Figure 1:
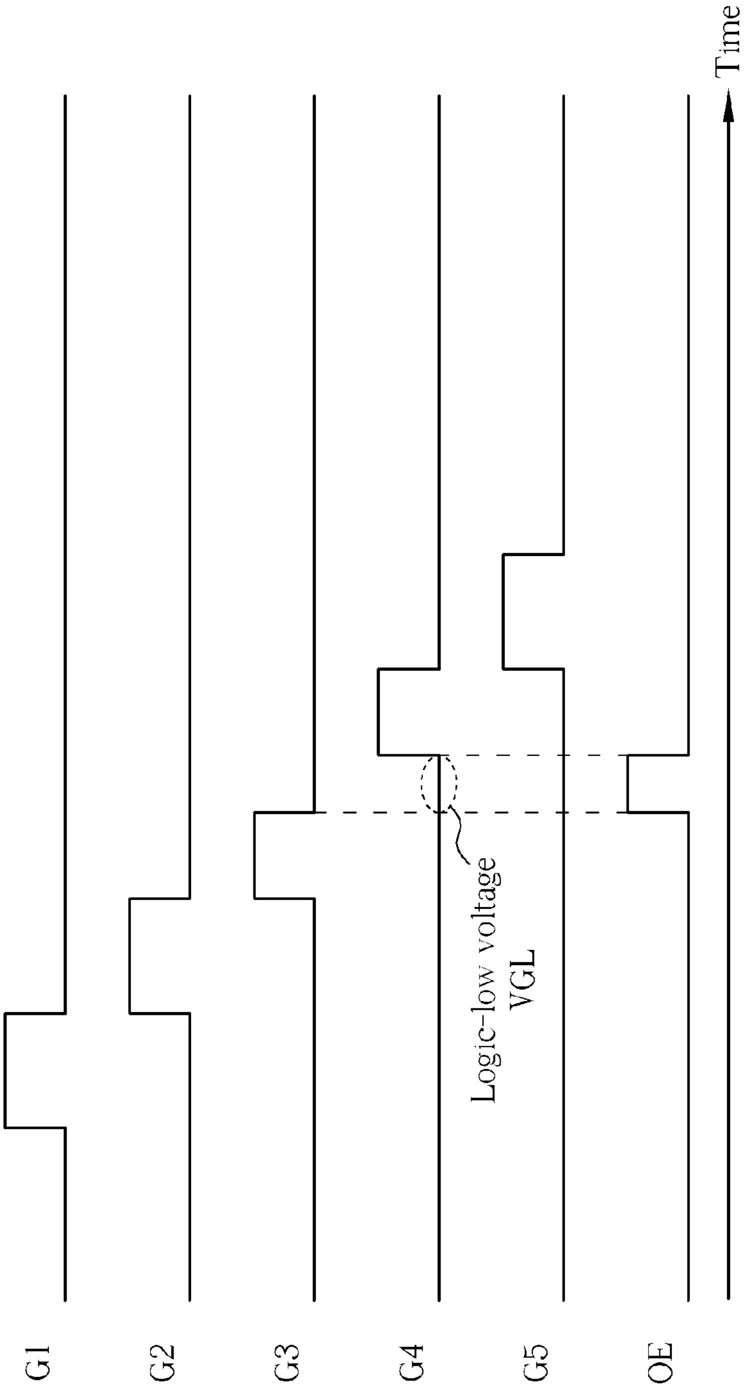
FIG. 1 PRIOR ART
FIG. 1 is a diagram illustrating an output signal of a scan line being at a logic-low voltage VGL when the output enable signal is enabled.
Figure 2:
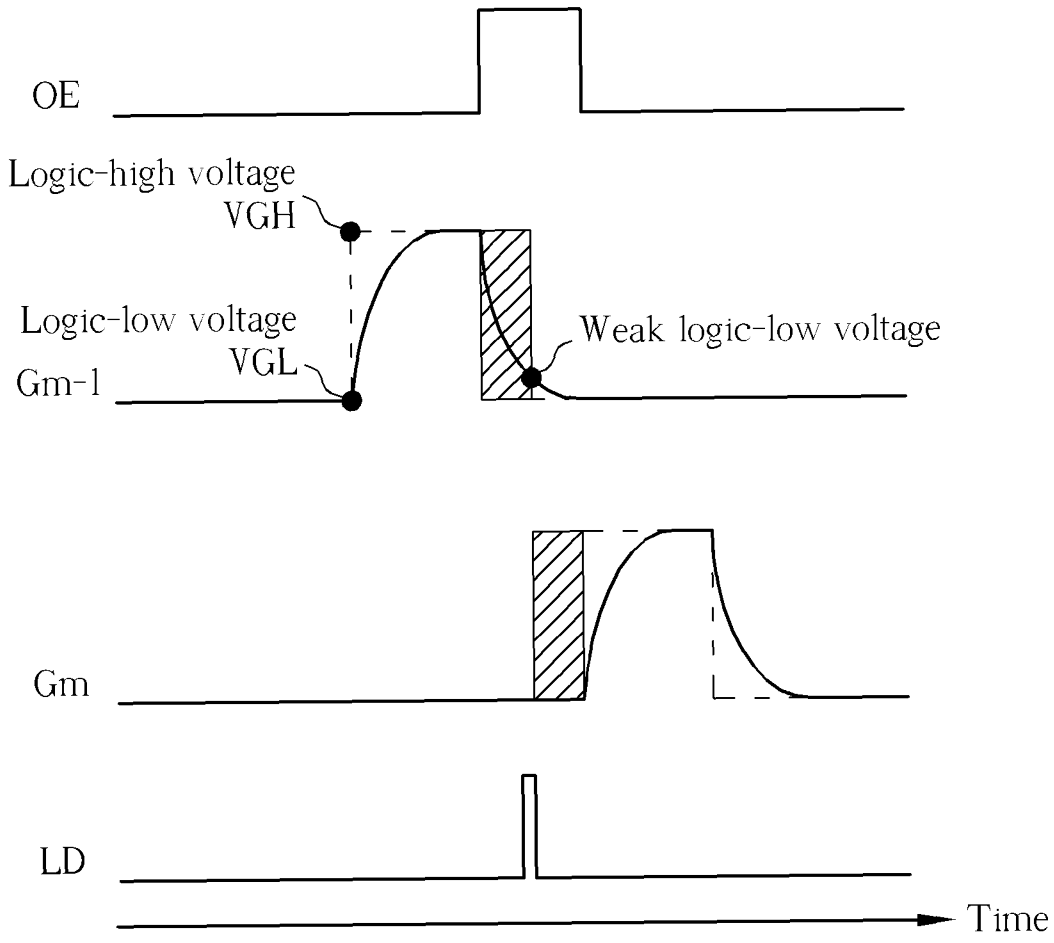
FIG. 2 PRIOR ART
FIG. 2 is a diagram illustrating mistake charging of the pixels due to the weak logic-low voltage.
Figure 3:
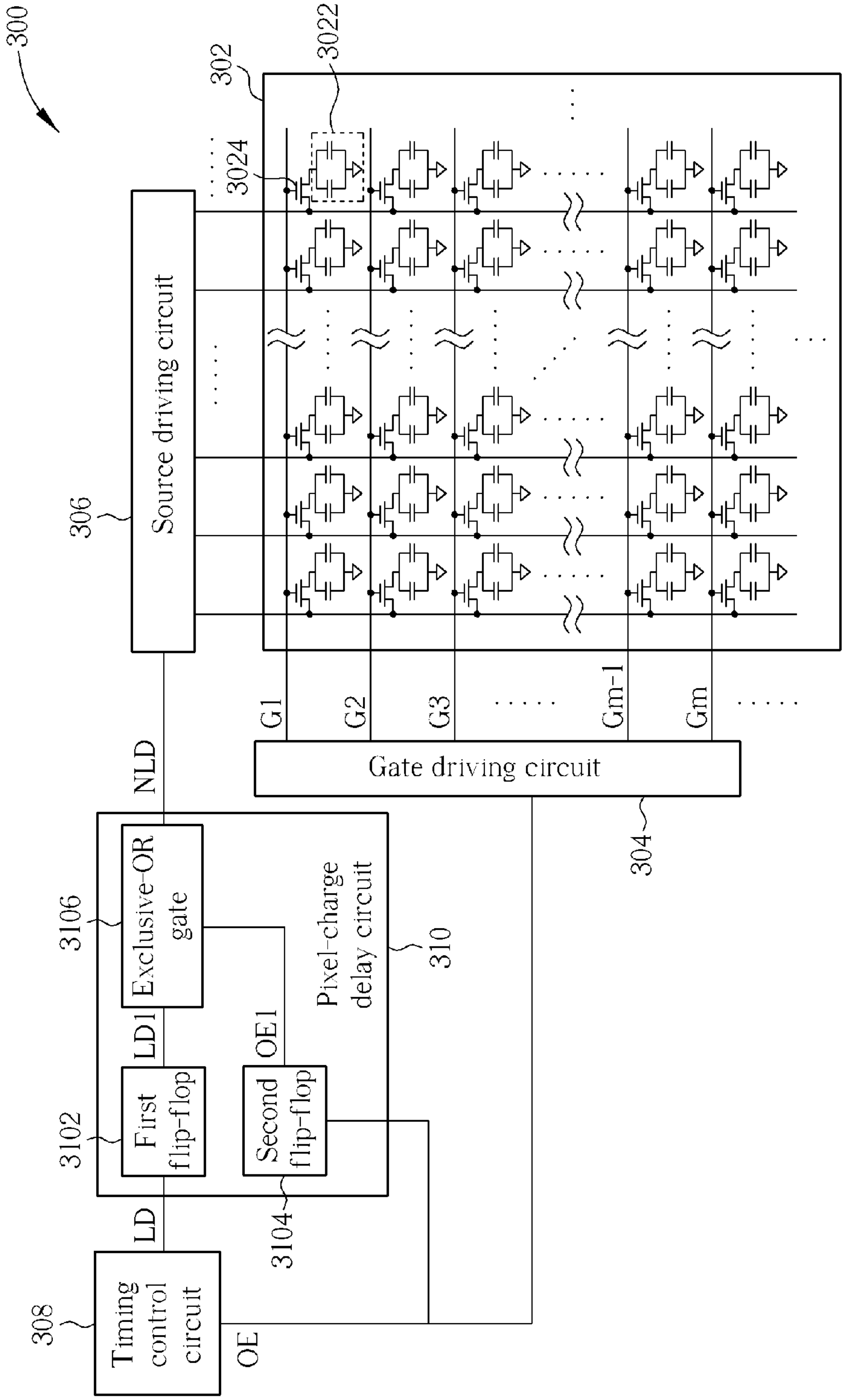
FIG. 3 is a diagram illustrating a liquid crystal display system for improving display color mismatch according to an embodiment of the present invention.

Please refer to FIG. 3. FIG. 3 is a diagram illustrating a liquid crystal display system 300 for improving display color mismatch according to an embodiment of the present invention. The liquid crystal display system 300 includes a liquid crystal display panel 302, a gate driving circuit 304, a source driving circuit 306, a timing control circuit 308, and a pixel-charge delay circuit 310. The liquid crystal display panel 302 has a plurality of pixels 3022. The gate driving circuit 304 is used for controlling output signals of a plurality of scan lines G1, G2, G3, . . . , Gm-1, Gm, . . . , where an output signal of each scan line of the plurality of scan lines G1, G2, G3, . . . , Gm-1, Gm, . . . is used for controlling turning-on and turning-off of a switch 3024 coupled to a pixel 3022, and the switch 3024 coupled to the pixel 3022 is a thin film transistor. The source driving circuit 306 is used for converting display data into a data voltage, and then charging/discharging a corresponding pixel 3022 to a voltage corresponding to a gray level according to the data voltage. The timing control circuit 308 is coupled to the gate driving circuit 304 for generating and sending an output enable signal OE to the gate driving circuit 304, and a latch data signal LD. The output enable signal OE is used for adjusting a time interval between an output signal of a scan line and an output signal of an adjacent scan line. The pixel-charge delay circuit 310 is coupled to the timing control circuit 308 and the source driving circuit 306 for generating and sending a new latch data signal NLD to the source driving circuit 306 according to the output enable signal OE and the latch data signal LD.

The pixel-charge delay circuit 310 includes a first flip-flop 3102, a second flip-flop 3104, and an exclusive-OR gate 3106, where the first flip-flop 3102 and the second flip-flop 3104 are D flip-flops. The pixel-charge delay circuit 310 is coupled to the timing control circuit 308 and the source driving circuit 306. When the first flip-flop 3102 receives the latch data signal LD, the first flip-flop 3102 is used for generating a first latch data signal LD1 according to a positive edge of the latch data signal LD. That is to say, when the latch data signal LD is converted from a logic-low voltage 0 to a logic-high voltage 1, the first latch data signal LD1 outputted by the first flip-flop 3102 is at the logic-high voltage 1, and the first latch data signal LD1 is not converted to the logic-low voltage 0 until next positive edge of the latch data signal LD. Similarly, because the second flip-flop 3104 is a negative edge triggered flip-flop, when the output enable signal OE is converted from the logic-high voltage 1 to the logic-low voltage 0, the first output enable signal OE1 outputted by the second flip-flop 3104 is the logic-high voltage 1. That is to say, when the output enable signal OE is converted from the logic-high voltage 1 to the logic-low voltage 0, the first output enable signal OE1 outputted by the second flip-flop 3104 is at the logic-high voltage 1, and the first output enable signal OE1 is not converted to the logic-low voltage 0 until next negative edge of the output enable signal OE. The exclusive-OR gate 3106 is coupled to the first flip-flop 3102 and the second flip-flop 3104 for generating and sending the new latch data signal LD to the source driving circuit 306 according to the first latch data signal LD1 and the first output enable signal OE1.

Figure 4:
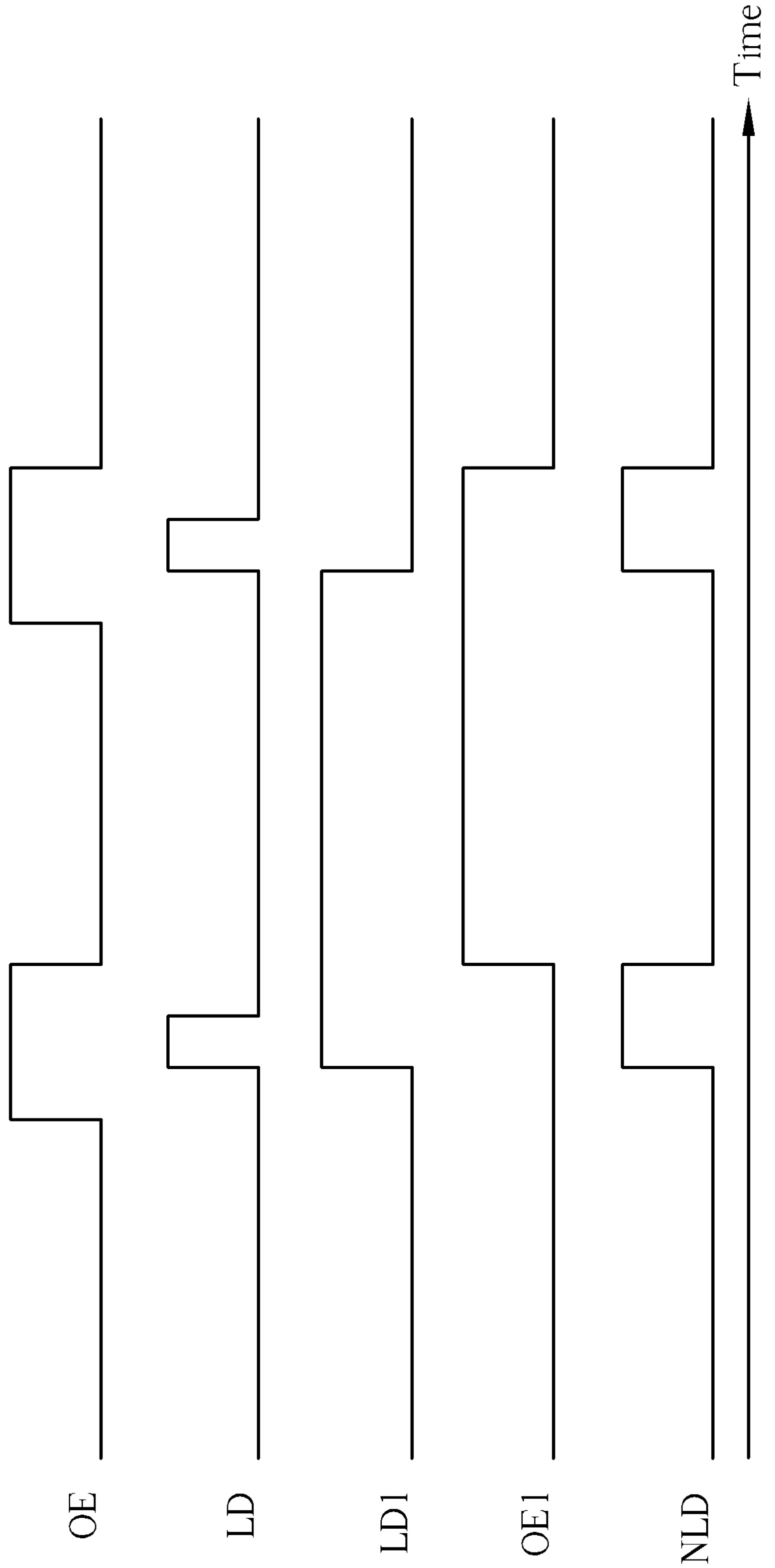
FIG. 4 is a diagram illustrating relationships among the latch data signal, the output enable signal, the first latch data signal, the first output enable signal, and the new latch data signal.
Figure 5:
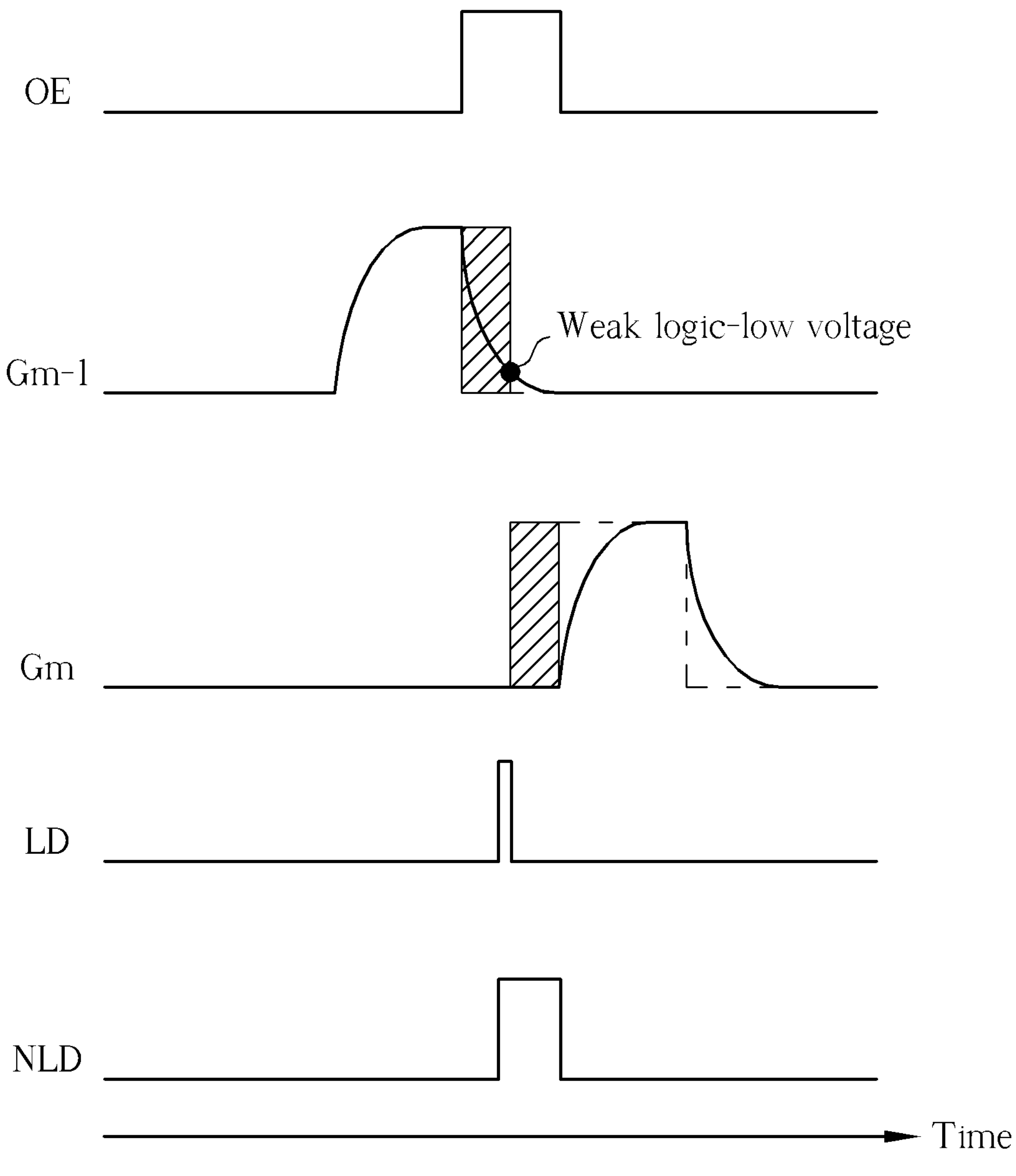
FIG. 5 is a diagram illustrating charging of the pixel being delayed by the new latch data signal.

Please refer to FIG. 4 and FIG. 5. FIG. 4 is a diagram illustrating relationships among the latch data signal LD, the output enable signal OE, the first latch data signal LD1, the first output enable signal OE1, and the new latch data signal NLD, and FIG. 5 is a diagram illustrating charging of the pixel 3022 being delayed by the new latch data signal NLD. As shown in FIG. 4, because the first flip-flop 3102 is a positive edge triggered flip-flop, the first latch data signal LD1 is converted from the logic-low voltage 0 to the logic-high voltage 1 according to the positive edge of the latch data signal LD. Similarly, the first output enable signal OE1 is converted from the logic-low voltage 0 to the logic-high voltage 1 according to the negative edge of the output enable signal OE. The new latch data signal NLD is an output signal of the exclusive-OR gate 3106, so when the first latch data signal LD1 and the first output enable signal OE1 are at opposite logic-voltages, the new latch data signal NLD is at the logic-high voltage 1. As shown in FIG. 5, a negative edge of the new latch data signal NLD appears after a negative edge of the latch data signal LD, so when the pixel 3022 of the scan line Gm starts to be charged, a weak logic-high voltage of an output signal of the scan line Gm-1 can be avoided. Thus, the source driving circuit 306 cannot charge the pixel 3022 of the scan line Gm-1 when the source driving circuit 306 starts to charge the pixel 3022 of the scan line Gm according to the negative edge of the new latch data signal NLD.

Figure 6:
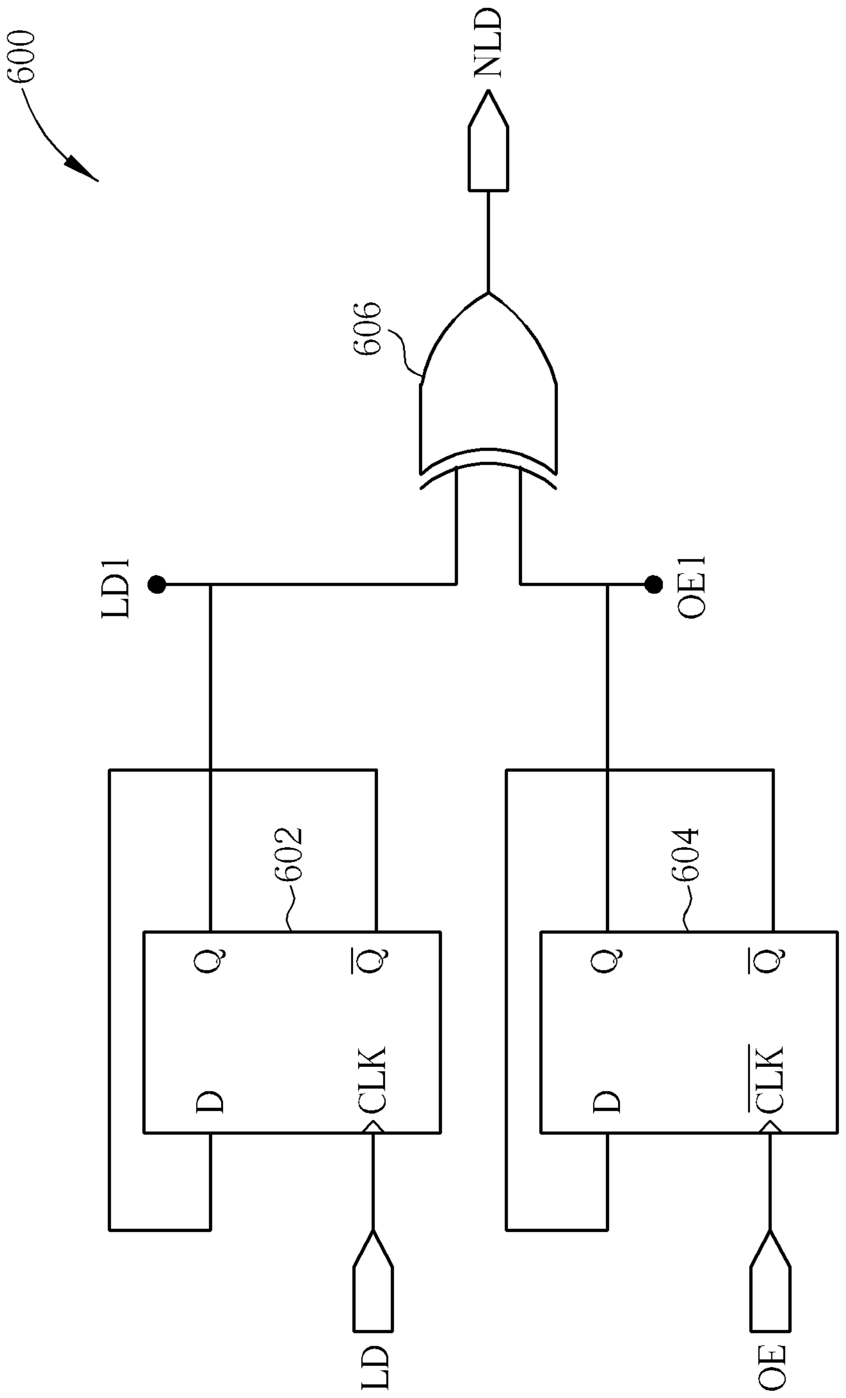
FIG. 6 is a diagram illustrating a pixel-charge delay circuit of the liquid crystal display system for improving display color mismatch according to another embodiment of the present invention.

Please refer to FIG. 6. FIG. 6 is a diagram illustrating a pixel-charge delay circuit 600 of the liquid crystal display system for improving display color mismatch according to another embodiment of the present invention. The pixel-charge delay circuit 600 includes a first flip-flop 602, a second flip-flop 604, and an exclusive-OR gate 606. The latch data signal LD generated by the timing control circuit 308 is inputted to a clock input terminal CLK of the first flip-flop 602, and a negative output terminal $\overline{Q}$ of the first flip-flop 602 is coupled to an input terminal D of the first flip-flop 602. Thus, the first flip-flop 602 is a positive edge triggered flip-flop, and an output terminal Q of the first flip-flop 602 is used for outputting the first latch data signal LD1. The output enable signal OE generated by the timing control circuit 308 is inputted to a negative clock input terminal $\overline{CLK}$ of the second flip-flop 604, and a negative output terminal $\overline{Q}$ of the second flip-flop 604 is coupled to an input terminal D of the second flip-flop 604. Thus, the second flip-flop 604 is a negative edge triggered flip-flop, and an output terminal Q of the second flip-flop 604 is used for outputting the first output enable signal OE1. Please refer to FIG. 7. FIG. 7 is a truth table of the exclusive-OR gate 606. The relationships among the latch data signal LD, the output enable signal OE, the first latch data signal LD1, the first output enable signal OE1, and the new latch data signal NLD are shown in FIG. 4. Subsequent operational principles of the pixel-charge delay circuit 600 are the same as the pixel-charge delay circuit 310, so further description thereof is omitted for simplicity.

To sum up, the liquid crystal display system for improving display color mismatch provided by the present invention utilizes the pixel-charge delay circuit to generate the new latch data signal, and the negative edge of the new latch data signal appears after the negative edge of the latch data signal. Thus, the thin film transistor of the scan line Gm-1 is turned off completely when the pixel of the scan line Gm is charged, so the present invention can solve color mismatch of the liquid crystal display panel.

Those skilled in the art will readily observe that numerous modifications and alterations of the device and method may be made while retaining the teachings of the invention.

What is claimed is:

1. A liquid crystal display system, comprising:

a liquid crystal display panel having a plurality of pixels;

a gate driving circuit for controlling output signals of a plurality of scan lines, wherein an output signal of each scan line is used for controlling turning-on and turning-off of a switch coupled to a pixel;

a source driving circuit for converting display data into a data voltage, then charging/discharging a corresponding pixel to a voltage corresponding to a gray level according to the data voltage;

a timing control circuit coupled to the gate driving circuit for generating and sending an output enable signal to the gate driving circuit, and a latch data signal; and a pixel-charge delay circuit coupled to the timing control circuit and the source driving circuit for generating and sending a new latch data signal to the source driving circuit according to the output enable signal and the latch data signal, the pixel-charge delay circuit comprising:

a first flip-flop for generating a first latch data signal according to a positive edge of the latch data signal;

a second flip-flop for generating a first output enable signal according to a negative edge of the output enable signal; and an exclusive-OR gate coupled to the first flip-flop and the second flip-flop for generating the new latch data signal according to the first latch data signal and the first output enable signal.

2. The liquid crystal display system of claim 1, wherein the first flip-flop and the second flip-flop are D flip-flops.

3. The liquid crystal display system of claim 1, wherein the output enable signal is used for adjusting a time interval between an output signal of a scan line and an output signal of an adjacent scan line.

4. The liquid crystal display system of claim 1, wherein a negative edge of the new latch data signal is in front of a positive edge of the output signal of the each scan line.

5. The liquid crystal display system of claim 1, wherein the source driving circuit charges the corresponding pixel according to the data voltage, the new latch data signal, and the turning-on of the switch coupled to the corresponding pixel.

6. The liquid crystal display system of claim 1, wherein the switch coupled to the pixel is a thin film transistor.

7. A pixel-charge delay circuit applied to a liquid crystal display system, the pixel-charge delay circuit comprising:

a first flip-flop for generating a first latch data signal according to a positive edge of the latch data signal from a timing control circuit of the liquid crystal display system;

a second flip-flop for generating a first output enable signal according to a negative edge of an output enable signal of the timing control circuit; and an exclusive-OR gate coupled to the first flip-flop and the second flip-flop for generating and sending the new latch data signal to a source driving circuit of the liquid crystal display system according to the first latch data signal and the first output enable signal.

8. The pixel-charge delay circuit of claim 7, wherein the first flip-flop and the second flip-flop are D flip-flops.

* * * * *